United States Patent
Licsar et al.

(10) Patent No.: US 9,527,429 B2
(45) Date of Patent: Dec. 27, 2016

(54) METHOD AND DEVICE FOR CONTROLLING A LIGHT EMISSION OF AT LEAST ONE HEADLIGHT OF A VEHICLE

(71) Applicant: Robert Bosch GmbH, Stuttgart (DE)

(72) Inventors: Attila Licsar, Ajka (HU); Andras Sarosi, Szekesfehervar (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/793,001

(22) Filed: Jul. 7, 2015

(65) Prior Publication Data

US 2016/0016504 A1 Jan. 21, 2016

(30) Foreign Application Priority Data

Jul. 21, 2014 (DE) .................. 10 2014 214 097

(51) Int. Cl.
*B60Q 1/08* (2006.01)

(52) U.S. Cl.
CPC .................. *B60Q 1/08* (2013.01); *B60Q 1/085* (2013.01); *B60Q 2300/32* (2013.01); *B60Q 2300/335* (2013.01); *B60Q 2300/337* (2013.01)

(58) Field of Classification Search
CPC ........ B60Q 1/08; B60Q 1/085; G06K 9/00825
USPC ........................................................... 701/49
See application file for complete search history.

(56) References Cited

U.S. PATENT DOCUMENTS

| | | | | |
|---|---|---|---|---|
| 2004/0230358 | A1* | 11/2004 | Stam .................... | B60Q 1/1423 701/49 |
| 2008/0294315 | A1* | 11/2008 | Breed .................... | B60N 2/002 701/49 |
| 2014/0257644 | A1* | 9/2014 | Galbas .................. | B60Q 1/085 701/49 |
| 2015/0127227 | A1* | 5/2015 | Strolz .................... | B60Q 1/085 701/49 |
| 2015/0151669 | A1* | 6/2015 | Meisner ................. | B60Q 1/085 701/49 |

* cited by examiner

*Primary Examiner* — McDieunel Marc
*Assistant Examiner* — James E Stroud
(74) *Attorney, Agent, or Firm* — Norton Rose Fulbright US LLP; Gerard Messina

(57) ABSTRACT

A method for controlling a light emission of at least one headlight of a, includes determining structure information which represents the presence of a structure which at least partially encloses a roadway traveled by the vehicle. The method also includes generating a control signal for controlling the light emission, using the structure information.

20 Claims, 3 Drawing Sheets

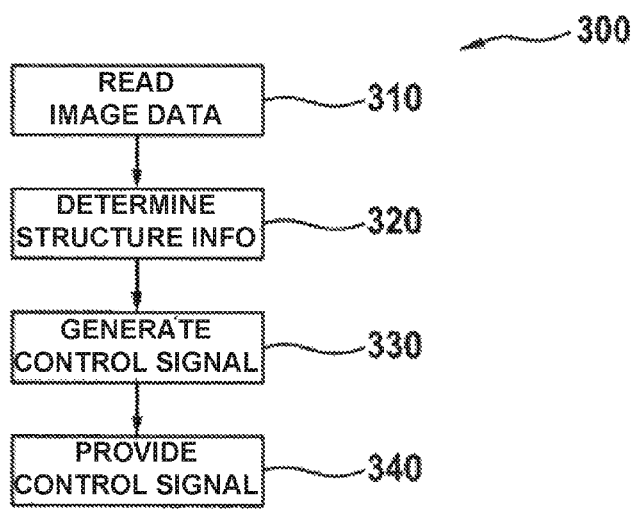
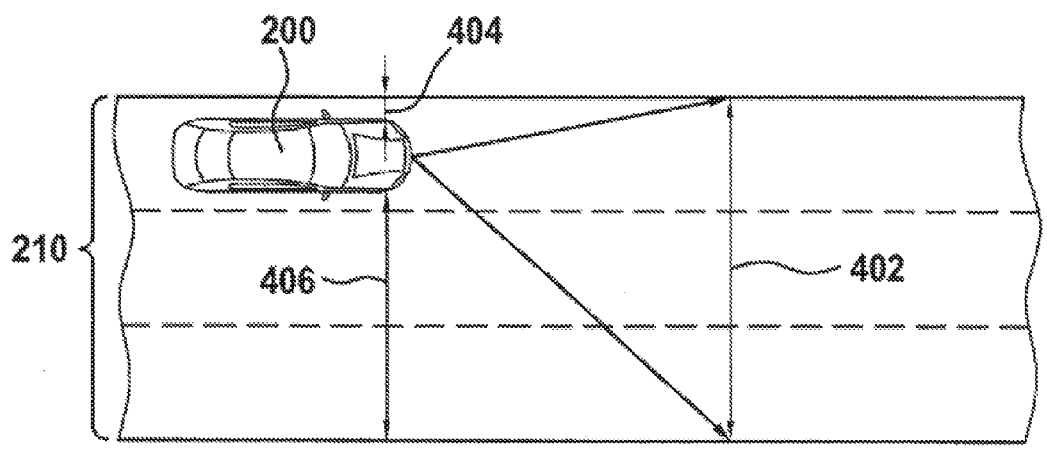

METHOD AND DEVICE FOR CONTROLLING A LIGHT EMISSION OF AT LEAST ONE HEADLIGHT OF A VEHICLE

RELATED APPLICATION INFORMATION

The present application claims priority to and the benefit of German patent application no. 10 2014 214 097.8, which was filed in Germany on Jul. 21, 2014, the disclosure of which is incorporated herein by reference.

FIELD OF THE INVENTION

The present invention relates to a method for controlling a light emission of at least one headlight of a vehicle, a corresponding device, and a corresponding computer program.

BACKGROUND INFORMATION

Recent adaptive headlight systems, in particular of motor vehicles, may typically have improved lighting power or illumination of a roadway or vehicle surroundings compared to older headlights in order to achieve better visibility in traffic. In road tunnels, for example, regulations require traveling with the low beam light switched on.

SUMMARY OF THE INVENTION

Against this background, using the approach presented here, a method for controlling a light emission of at least one headlight of a vehicle, a device which uses this method, and lastly, a corresponding computer program, are provided according to the main claims. Advantageous embodiments result from the respective subclaims and the following description.

According to specific embodiments of the present invention, in particular a vehicle headlight system may be adapted, with regard to its light emission, to geometric and/or optical conditions, for example, which prevail in segments of a vehicle route, in which a roadway traveled by the vehicle at that moment is completely or partially enclosed by a structure. For this purpose, for example parameters of the structure and optionally a vehicle position relative to the structure may be detected, and the light emission from vehicle headlights may be adapted to such parameters. In particular, it may be achieved that at least one partial section of the structure is excluded from a light cone generated by the vehicle headlights or is situated outside the light cone.

According to specific embodiments of the present invention, the light emission from vehicle headlights may advantageously be adapted within traffic structures or buildings, within which a roadway extends, in such a way that light reflections within the structures, for example on walls of the structures, which are bothersome to vehicle drivers may be avoided. Traffic safety may thus be improved within traffic structures or buildings, and driving comfort for vehicle drivers may be enhanced.

A method for controlling a light emission of at least one headlight of a vehicle is provided, the method including the following tasks:

determining structure information which represents the presence of a structure which at least partially encloses a roadway traveled by the vehicle; and generating a control signal for controlling the light emission, using the structure information.

The vehicle may be a motor vehicle, in particular a road-bound motor vehicle such as a passenger vehicle, a truck, or some other utility vehicle. The at least one headlight may be a front headlight of the vehicle. The light emission of at least one headlight or of all headlights of the vehicle may be controlled together by carrying out the method. The at least one headlight may be based on halogen technology, xenon technology, light-emitting diode (LED) technology, or the like. In addition, the at least one headlight may be part of an adaptive headlight system, light system, or illumination system of the vehicle. The structure may include a road structure or a building, for example a tunnel, a depressed roadway, an enclosure, an underpass, a noise barrier, an aboveground parking garage, an underground parking garage, or the like. The method may be carried out repeatedly when the vehicle is traveling through the structure.

According to one specific embodiment, the method may include a step of reading in image data of the surroundings of the vehicle from an interface with a surroundings recognition device of the vehicle. The structure information may be determined in the step of determining, using the image data. The vehicle may include the surroundings recognition device. The surroundings recognition device may be fixedly installed or removably mounted in or on the vehicle. The surroundings recognition device may be configured for detecting or recording the surroundings of the vehicle, in particular in the travel direction, and providing same in the form of the image data. In addition, the surroundings recognition device or a device capable of transmitting data and connected or connectable to the surroundings recognition device may include a processing device for processing the image data, using at least one processing algorithm. The surroundings recognition device may be a camera or vehicle camera, radar device, light detection and ranging (LIDAR) device, laser detection and ranging (LADAR) device, or the like which is installed in the vehicle. The surroundings of the vehicle may include at least one partial segment of the roadway. Such a specific embodiment offers the advantage that the presence of a structure may be accurately determined, and devices and infrastructure which are already installed in vehicles anyway may be utilized. The light control may thus be carried out in a particularly cost-effective manner.

In addition, at least one dimension of the roadway, and additionally or alternatively, of the structure, may be determined in the step of determining. The control signal may be generated in the step of generating, using the at least one dimension. The at least one dimension may be a clear passage height, a clear passage width, a roadway width, a distance between the roadway and the structure, and/or the like. The at least one dimension may be determined using the image data. A control signal may be generated in the step of generating, using the at least one dimension, which effectuates a light emission that is adapted to the at least one dimension. The smaller a dimension, for example, the more the light emission may be limited with the aid of the control signal. Such a specific embodiment offers the advantage that the light emission may be adapted particularly accurately to conditions within the structure. Reliable avoidance of glare may be achieved in this way.

Furthermore, a relative position of the vehicle with respect to the roadway, and additionally or alternatively, with respect to the structure, may be determined in the step of determining. The control signal may be generated in the step of generating, using the relative position. The relative position of the vehicle may be determined, using position data, driving data, and additionally or alternatively, surroundings data of the vehicle. In addition, the relative position of the vehicle may be determined, using data ascertained with the aid of the surroundings recognition device. A lane of the roadway traveled by the vehicle, a travel direction, and additionally or alternatively, a distance between the vehicle and the structure, may be estimated for determining the relative position. Using the relative position, a control signal may be generated in the step of generating which effectuates a light emission that is adapted to the relative position. The closer the relative position, for example, of the vehicle to a wall of the structure, the more the light emission toward this wall may be limited with the aid of the control signal. Such a specific embodiment offers the advantage that the light emission may be controlled even more accurately according to the situation, so that avoidance of glare may be further improved.

In addition, at least one partial section of a wall of the structure may be determined in the step of determining. The wall may be determined using the image data. A partial section of the wall may include a section of a wall of the structure adjacent to the roadway. At least one partial section of at least one wall may also be determined. Such a specific embodiment offers the advantage that structural properties of the structure may also be ascertained to be able to adapt the light emission or light distribution even more accurately.

The control signal may be generated in the step of generating in such a way that the at least one partial section of the wall of the structure is excluded from the light emission of the at least one headlight. The control signal may be suitable for effectuating a light emission for which the at least one partial section of the wall of the structure is excluded from the light distribution or light cone of the light emission, and is thus not illuminated. Such a specific embodiment offers the advantage that blinding of vehicle drivers by potentially reflective walls of structures or by reflective objects situated on such walls may be reliably avoided.

In addition, the method may include a step of providing the control signal to an interface with a light control device of the vehicle. The control signal may be usable by the light control device in order to adjust the light emission of the at least one headlight. The light control device may be part of an adaptive light system of the vehicle. The light control device may also in particular be configured for steplessly adjusting the light emission or adapting it to the building, using the control signal. Such a specific embodiment offers the advantage that an accurate, reliable adjustment or adaptation of the light emission may be implemented with the aid of components already installed in the vehicle, using the control signal.

The approach provided here also provides a device which is configured for carrying out, controlling, or implementing the steps of one variant of a method provided here in appropriate devices.

The underlying object of the present invention may also be achieved quickly and efficiently by this embodiment variant of the present invention in the form of a device.

In the present context, a device may be understood to mean an electrical device which processes sensor signals and outputs control and/or data signals as a function thereof. The device may include an interface which may have a hardware and/or software design. In a hardware design, the interfaces may be part of a so-called system ASIC, for example, which contains various functions of the device. However, it is also possible for the interfaces to be dedicated integrated circuits, or to be at least partially composed of discrete components. In a software design, the interfaces may be software modules which are present on a microcontroller, for example, in addition to other software modules.

Also advantageous is a computer program product or a computer program including program code which may be stored on a machine-readable carrier or memory medium such as a semiconductor memory, a hard disk, or an optical memory, and used for carrying out, implementing, and/or controlling the steps of the method according to one of the above-described specific embodiments, in particular when the program product or program is executed on a computer or a device.

The approach provided here is explained in greater detail below as an example, with reference to the appended drawings.

BRIEF DESCRIPTION OF THE DRAWINGS

FIG. 3 shows a flow chart of a method for controlling according to one exemplary embodiment of the present invention.

FIG. 4 shows a schematic example diagram of the vehicle from FIG. 2 on a roadway within a structure.

DETAILED DESCRIPTION

Figure 1:
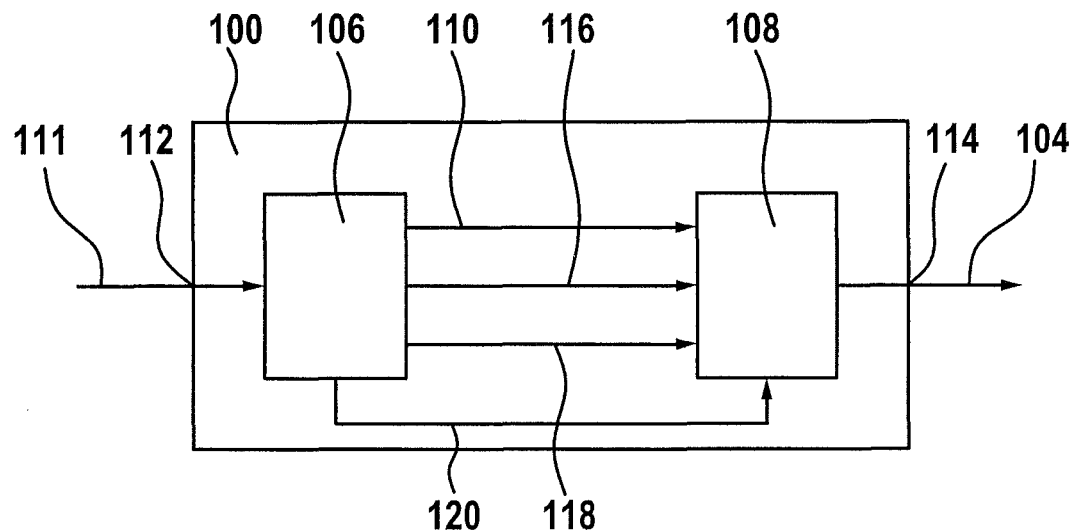
FIG. 1 shows a schematic illustration of a control device according to one exemplary embodiment of the present invention.

In the following description of advantageous exemplary embodiments of the present invention, identical or similar reference numerals are used for the elements having a similar action which are illustrated in the various figures, and a repeated description of these elements is dispensed with.

FIG. 1 shows a schematic illustration of a control device 100 or device for controlling a light emission of at least one headlight of a vehicle according to one exemplary embodiment of the present invention. Control device 100 is configured for generating and outputting a control signal 104 for controlling the light emission.

Control device 100 includes a determination device 106 and a generation device 108. Determination device 106 is configured for determining structure information 110. The structure information represents the presence of a structure which at least partially encloses or surrounds a roadway being traveled by the vehicle at that moment. Determination device 106 is configured for providing generation device 108 with structure information 110. Generation device 108 is configured for receiving structure information 110 and using structure information 110 for generating and outputting control signal 104. Generation device 108 is configured for generating control signal 104 in such a way that it is suitable for effectuating a light emission, which is adapted to the structure, by the at least one headlight.

According to one exemplary embodiment, control device 100 is configured for receiving image data 111 of the surroundings of the vehicle. Device 100 is configured for reading in image data 111 from an interface 112 with a surroundings recognition device of the vehicle and relaying the image data to determination device 106. Determination device 106 is configured for determining structure information 110, using image data ill. Device 100 is configured for providing the control signal to a light control device of the vehicle via an output interface 114, for example in the form of a provision device.

According to one exemplary embodiment, determination device 106 is configured for determining a dimension of the roadway or of the structure, using image data 111, and outputting dimension data 116 which represent the dimension to generation device 108. Generation device 108 is configured for generating control signal 104, using dimension data 116. The light emission may thus be adapted, for example, to a width of the roadway, so that the light emission does not extend beyond the roadway.

According to one exemplary embodiment, determination device 106 is configured for determining a relative position of the vehicle with respect to the roadway, and additionally or alternatively, with respect to the structure, using image data 111. Determination device 106 is configured for outputting relative position data 118, which represent the position of the vehicle in relation to the roadway or the structure, to generation device 108. Generation device 108 is configured for generating control signal 104, using relative position data 118. The light emission may thus be adapted, for example, to a distance between the vehicle and a wall of the structure, so that the structure is not illuminated by the light emission.

According to another exemplary embodiment, determination device 106 is configured for determining at least one partial section, for example an upper section situated at a certain height, of a wall of the structure, using image data 111. Determination device 106 is configured for outputting wall data 120, which represent the at least one partial section of the wall, to generation device 108. Generation device 108 is configured for generating control signal 104, using wall data 120, in such a way that the at least one partial section of the wall of the structure is outside a light cone of the at least one headlight.

Figure 2:
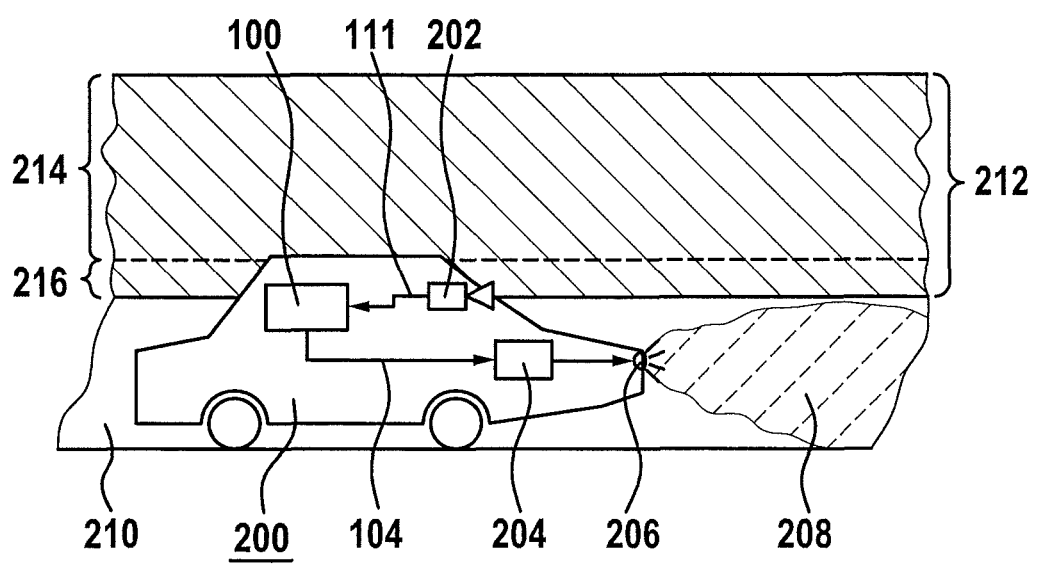
FIG. 2 shows a schematic illustration of a vehicle which includes the control device from FIG. 1.

FIG. 2 shows a schematic illustration of a vehicle 200 which includes a control device 100, also referred to as an actuating device, according to one exemplary embodiment of the present invention. Control device 100 is configured for controlling a light emission of at least one headlight 206 of vehicle 200. Control device 100 may be the control device described with reference to FIG. 1.

In the exemplary embodiment of the present invention illustrated in FIG. 2, vehicle 200 is a motor vehicle in the form of a passenger vehicle. Vehicle 200 includes control device 100, a vehicle camera 202 as the surroundings recognition device, a light control device 204, and a headlight 206. Headlight 206 is a front headlight, which is shown in FIG. 2 in a switched-on state, headlight 206 causing a light emission 208 which generates a light distribution or a light cone.

Vehicle camera 202 is configured for providing image data 111 which depict the surroundings of vehicle 200. As already described and illustrated in FIG. 1, according to one exemplary embodiment, control device 100 is configured for receiving image data 111 from vehicle camera 202.

For controlling light emission 208, control device 100 is configured for providing control signal 104 for light control device 204. Light control device 204 is configured for adjusting or controlling light emission 208 of headlight 206, using control signal 104. For example, light control device 204 may be configured for adjusting an angle of light emission 208.

Vehicle 200 is situated on a roadway 210 or a street. Roadway 210 extends in a structure in the form of a road structure, for example a road tunnel. Of the structure, a wall 212, i.e., a side wall, is shown in FIG. 2.

According to this exemplary embodiment, control device 100 is configured for recognizing wall 212, using image data 111, and generating control signal 104 in such a way that wall 212 is not illuminated by, i.e., is excluded from, light emission 208 of headlight 206. Light emission 208 of headlight 206 thus extends over roadway 210 up to wall 212. Wall 212 is not illuminated in the process.

According to one exemplary embodiment, wall 212 has an upper section 214 and a lower section 216. Lower section 216 is situated between roadway 210 and upper section 214. According to one exemplary embodiment, control device 100 is configured for determining upper section 214 of wall 212, using image data 111 from vehicle camera 202, and generating the control signal in such a way that upper section 214 of wall 212 is excluded from light emission 208 of headlight 206. In contrast, lower section 216 may be encompassed by light emission 208 of headlight 206. Lower section 216 may represent an area of wall 212 which causes no glare effects for a driver of vehicle 200 and/or another vehicle when illuminated by light emission 208 of headlight 206. Lower section 216 may extend, for example, up to a height of 30 cm or 50 cm of wall 212.

Exemplary embodiments of the present invention are explained below in summary form, i.e., briefly, with reference to FIGS. 1 through 6 and basic conditions.

Exemplary embodiments of the present invention may relate to an adaptive front-lighting system (AFS), a travel corridor, a road tunnel, a multi-purpose camera (MPC), a driver assistance system, and the like. According to one exemplary embodiment of the present invention, an adaptive vehicle light system may be provided for structure surroundings, for example road tunnel surroundings, or the like. According to one exemplary embodiment of the present invention, a control device 100 may be part of an adaptive vehicle light system or a headlight system or a vehicle light system.

Traffic regulations frequently specify that active headlights must be used within road structures, for example; daytime running lights are not adequate, and instead low beam light is required. In addition, development of adaptive light systems has led to continuous improvement of lighting power and adaptive light distribution for better visibility.

Adaptive light systems are adaptive, for example, with respect to the surroundings, such as a roadway curve, a type of street in a city, on an expressway, etc., with regard to weather conditions such as fog, for example, in which high beam light is switched off and fog lights are activated, snow, rain, etc., and with regard to road users, whereby an illuminated area for vehicle 200 or ego-vehicle is maximized without blinding other drivers. Such adaptive headlight systems are usually implemented based, for example, on navigation, speed, steering angle of vehicles, and also camera sensors.

Tunnels as structures or road structures represent special driving environs with a risk for accidents. The walls of tunnels normally have a reflective surface. With the aid of a control device 100 according to exemplary embodiments of the present invention, the situation may be prevented that using a vehicle headlight system results in bothersome light reflections and annoying glare for the driver of vehicle 200 or ego-vehicle, and flashing on walls 212 of structures, for example tunnels, which distracts the driver. Also in the case of recent types of headlights, for example xenon, LED, laser diodes, in which an emitted light intensity is higher than in other types of headlights, such as halogen, according to exemplary embodiments of the present invention a reflective effect on surfaces within structures which are usually flat and reflective may be at least mitigated or prevented.

Surroundings recognition device 202 or a camera system is configured for allowing a building structure, for example a tunnel structure, in particular a width of the roadway, a number of lanes, a position of walls 212, a lane actually used by vehicle 200, etc. to be detected or determined. With the aid of control device 100, light emission 208 or light distribution is adaptable to the measured or detected surroundings, so that fewer reflections result over the directed illuminated area.

Other active light control methods which are based on ego-vehicle data, steering angle, speed, position data, or light conditions may detect a structure and switch the dimmed light on or off. However, according to exemplary embodiments of the present invention, an illumination may be adapted to the particular scenarios or geometric and/or optical properties of structures, for example a different number of lanes, a width of a tunnel corridor, etc.

According to one exemplary embodiment, vehicle 200 includes a camera system or camera-based system which includes vehicle camera 202 and control device 100, headlights being adaptively adjustable to the particular structure surroundings by carrying out a method for controlling the light emission. The camera-based system detects, for example, entrances and exits of tunnels or the like at nighttime and daytime, based on an image analysis. Within the structure, the system measures parameters of a surface of roadway 210, for example a width of roadway 210 between walls 212 of the structure. Suitable image-based methods include, for example, roadway recognition, lane recognition, wall recognition, and/or estimation of the width of a tunnel entrance. The camera-based system is also configured for estimating a position of vehicle 200; this may take place based on an estimation of the ego-vehicle's lane, distances 404, 406 from walls 212, a vehicle direction, and/or the like. When these parameters, for example tunnel structure parameters and a relative position of vehicle 200 within a tunnel, are known, an optimal light emission 208 or an optimal illumination area may be defined with the aid of control device 100. The adaptive light system or illumination system modifies light emission 208 or light distribution in relation to the measured parameters, for example in order to exclude tunnel walls 212 from light emission 208 or a light cone of headlights 206.

Exemplary embodiments of the present invention are usable in conjunction with control systems for active headlights or active headlight control systems, for example with LED matrix headlights, xenon light systems with dynamic masking, and other systems with the capability for light cone positioning. Examples of fields of application of exemplary embodiments of the present invention with regard to structures are tunnels, depressed tunnel roadways, parking garages, parking facilities, or in general driving environs in which glare effects may potentially occur on walls.

FIG. 3 shows a flow chart of a method 300 for controlling a light emission of at least one headlight of a vehicle according to one exemplary embodiment of the present invention. Method 300 may be carried out using a control device as described with reference to FIGS. 1 and 2, for example.

According to the exemplary embodiment of the present invention illustrated in FIG. 3, method 300 includes a step 310 of reading in image data of the surroundings of the vehicle from an interface with a surroundings recognition device of the vehicle.

In addition, method 300 includes a step 320 of determining structure information. The structure information represents the presence of a structure which at least partially encloses a roadway traveled by the vehicle. The structure information is determined in step 320 of determining, using the read-in image data of the surroundings of the vehicle. Alternatively, the image data or the structure information may also be read out from a database. In this case, step 310 may be omitted or step 310 may be replaced or supplemented by a step of reading in the structure information from an appropriate database.

A control signal for controlling the light emission of the at least one headlight of the vehicle is generated in a step 330. The control signal is generated using the structure information.

According to one exemplary embodiment, method 300 includes a step 340 of providing the control signal to an interface with a light control device of the vehicle. The control signal is usable by the light control device to adjust the light emission of the at least one headlight.

FIG. 4 shows a schematic diagram of vehicle 200 from FIG. 2 on a roadway 210 within a structure according to one exemplary embodiment of the present invention. Vehicle 200 and roadway 210 are illustrated in a top view. Roadway 210 has three lanes in FIG. 4 only as an example. In the section of the roadway illustrated in FIG. 4, roadway 210 extends within a structure, for example in the form of a road tunnel. Walls of the structure are situated adjacent to edges of roadway 210.

The control device of vehicle 200 is configured for determining or measuring a dimension of roadway 210, in the form of a width 402 of a roadway surface, with the aid of a surroundings recognition device, for example a vehicle camera or a camera system, or for reading out width 402 from a database and taking it into account for generating a control signal for controlling a light emission of a headlight of vehicle 200.

According to one exemplary embodiment, the control device of vehicle 200 is configured for determining a relative position of vehicle 200, using a first measured distance 404 between vehicle 200 and a first edge of roadway 210, and using a second measured distance 406 between vehicle 200 and a second edge of roadway 210 opposite from the first edge, and taking this into account when generating the control signal. For example, the relative position may be used to adjust the beam angle of the light emission. For example, the control signal may be generated in such a way that it is suitable for decreasing a left beam angle of the light emission in order to reduce the light emission to the left, and for increasing a right beam angle of the light emission in order to extend the light emission to the right.

In other words, FIG. 4 illustrates a top view of a camera-based measurement of dimensions 402, 404, 406, i.e., tunnel structure parameters, and the relative position of vehicle 200 or ego-vehicle within the tunnel with the aid of the control device of vehicle 200.

Figure 5:
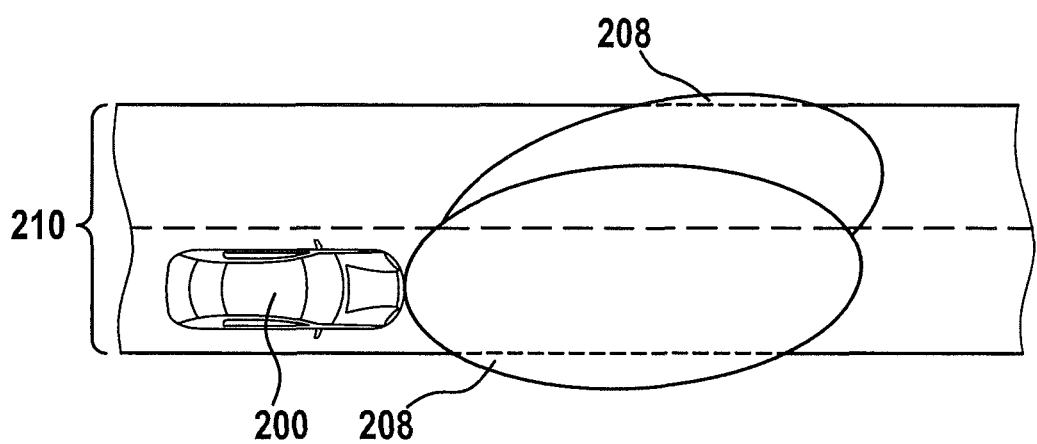
FIG. 5 shows another schematic example diagram of the vehicle from FIG. 2 on a roadway within a structure.

FIG. 5 shows a schematic example diagram of vehicle 200 from FIG. 2 on a roadway 210 within a structure according to one exemplary embodiment of the present invention. Vehicle 200 and roadway 210 are illustrated in a top view. Roadway 210 has two lanes in FIG. 5 only as an example.

Roadway 210 extends within a structure, for example within a road tunnel. Walls of the structure are situated adjacent to edges of roadway 210.

The control device of vehicle 200 is configured for generating a control signal, using detected or read-in data, which is suitable for effectuating an adaptation of light emission 208 of the headlights of the vehicle to geometric properties, for example at least one dimension, of the structure or road tunnel. The control device of vehicle 200 is thus configured for effectuating a light emission 208 or light distribution of the headlights of vehicle 200 which is adapted to the structure or the road tunnel. In FIG. 5 it is apparent that light emission 208 is directed onto a majority of an area between the edges of roadway 210, so that walls situated at the edges of the structure are illuminated only in a lower section.

Figure 6:
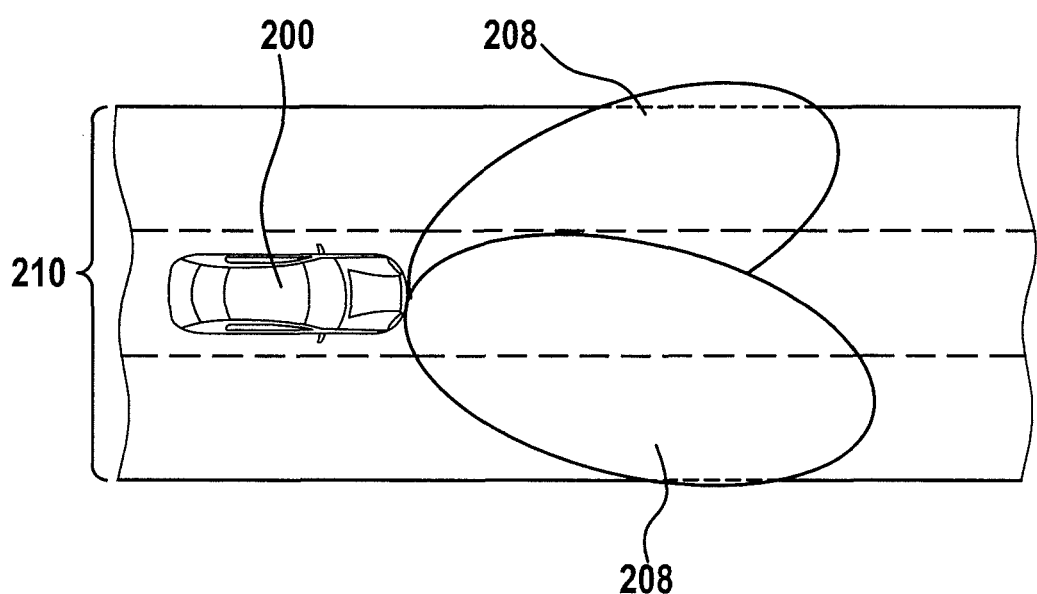
FIG. 6 shows another schematic example diagram of the vehicle from FIG. 2 on a roadway within a structure.

FIG. 6 shows a schematic example diagram of vehicle 200 from FIG. 2 on a roadway 210 within a structure according to one exemplary embodiment of the present invention. The illustration in FIG. 6 corresponds to the illustration in FIG. 5, with the exception that roadway 210 has three lanes in the illustration in FIG. 6. Thus, a width dimension of roadway 210 in FIG. 6 is greater than a width dimension of the roadway in FIG. 5. With the aid of the control device of vehicle 200, light emission 208 of the headlights of vehicle 200 is adapted to the width of the road tunnel in FIG. 6, which is now greater, so that light emission 208 continues to cover the entire width of the roadway, but walls situated at the edges of the structure are once again encompassed only in a lower section.

In other words, FIGS. 5 and 6 show top views of vehicle 200 and adaptively illuminated areas and areas not illuminated by light emissions 208, for different tunnel structures, namely, a different number of lanes of roadway 210 and a different width of the tunnel or structure.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment. Furthermore, the method steps provided here may be repeated, and carried out in a sequence different from that described.

If an exemplary embodiment includes an "and/or" linkage between a first feature and a second feature, this is to be construed in such a way that according to one specific embodiment, the exemplary embodiment includes the first feature as well as the second feature, and according to another specific embodiment includes only the first feature or only the second feature.

What is claimed is:

1. A method for controlling a light emission of at least one headlight of a vehicle, the method comprising:
   determining, by a control device of the vehicle interfaced with a surroundings recognition device of the vehicle, structure information which represents the presence of a structure which at least partially encloses a roadway traveled by the vehicle, wherein the structure is a road structure or a building; and
   generating, by the control device of the vehicle, a control signal for controlling the light emission, using the structure information.

2. The method of claim 1, further comprising:
   reading in image data, by the control device of the vehicle, of the surroundings of the vehicle from an interface with the surroundings recognition device of the vehicle, the structure information being determined in the determining, using the image data.

3. The method of claim 1, wherein at least one dimension of the roadway and/or of the structure is determined in the determining, the control signal being generated in the generating, using the at least one dimension.

4. The method of claim 1, wherein a relative position of the vehicle with respect to the roadway and/or with respect to the structure is determined in the determining, the control signal being generated in the generating, using the relative position.

5. The method of claim 1, wherein at least one partial section of a wall of the structure is determined in the determining, and the control signal is generated in the generating so that the at least one partial section of the wall of the structure is excluded from the light emission of the at least one headlight.

6. The method of claim 1, further comprising:
   providing, by the control device of the vehicle, the control signal to an interface with a light control device of the vehicle, the control signal being usable by the light control device to adjust the light emission of the at least one headlight.

7. A device for controlling a light emission of at least one headlight of a vehicle, comprising:
   a control device of the vehicle operable to interface with a surroundings recognition device of the vehicle, said control device comprising:
      a determination device to determine structure information which represents the presence of a structure which at least partially encloses a roadway traveled by the vehicle, wherein the structure is a road structure or a building; and
      a generation device to generate a control signal for controlling the light emission, using the structure information.

8. A non-transitory computer readable medium having a computer program, which is executable by a processor, comprising: a program code arrangement having program code for controlling a light emission of at least one headlight of a vehicle, by performing the following: determining, by a control device of the vehicle interfaced with a surroundings recognition device of the vehicle, structure information which represents the presence of a structure which at least partially encloses a roadway traveled by the vehicle, wherein the structure is a road structure or a building; and generating, by the control device of the vehicle, a control signal for controlling the light emission, using the structure information.

9. The computer readable medium of claim 8, further comprising:
   reading in image data, by the control device of the vehicle, of the surroundings of the vehicle from an interface with the surroundings recognition device of the vehicle, the structure information being determined in the determining, using the image data.

10. The method of claim 2, wherein the surroundings recognition device is a camera.

11. The device of claim 7, further comprising:
    wherein the control device reads in image data of the surroundings of the vehicle from an interface with the surroundings recognition device of the vehicle, and relays the image data to the determination device, the structure information being determined, by the determination device, using the image data.

12. The device of claim 11, wherein the surroundings recognition device is a camera.

13. The computer readable medium of claim 9, wherein the surroundings recognition device is a camera.

14. The method of claim 1, wherein the structure is the road structure.

15. The method of claim 14, wherein the road structure is a tunnel.

16. The method of claim 14, wherein the road structure is a depressed roadway.

17. The method of claim 14, wherein the road structure is an underpass.

18. The method of claim 1, wherein the structure is the building.

19. The method of claim 18, wherein the building is an enclosure.

20. The method of claim 18, wherein the building is a parking garage.

\* \* \* \* \*